(12) United States Patent
Collette et al.

(10) Patent No.: US 8,358,677 B2
(45) Date of Patent: Jan. 22, 2013

(54) VIRTUAL OR REMOTE TRANSPONDER

(75) Inventors: Daniel Ross Collette, Morristown, NJ (US); Vaughn Fulton, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 934 days.

(21) Appl. No.: 12/145,349

(22) Filed: Jun. 24, 2008

(65) Prior Publication Data
US 2009/0316755 A1    Dec. 24, 2009

(51) Int. Cl.
*H04B 1/00*    (2006.01)

(52) U.S. Cl. ............... 375/133; 701/1; 701/3; 701/120; 370/427

(58) Field of Classification Search .......... 375/133; 701/1, 3, 120; 370/98, 427
See application file for complete search history.

(56) References Cited

U.S. PATENT DOCUMENTS

| | | | |
|---|---|---|---|
| 4,899,156 A | 2/1990 | Litchford et al. | |
| 7,167,820 B2 | 1/2007 | Sarfati et al. | |
| 7,269,513 B2 | 9/2007 | Herwitz | |
| 7,414,567 B2* | 8/2008 | Zhang et al. | 342/29 |
| 2003/0152145 A1 | 8/2003 | Kawakita | |
| 2004/0148065 A1 | 7/2004 | Andrews et al. | |
| 2005/0187677 A1 | 8/2005 | Walker | |
| 2006/0253254 A1* | 11/2006 | Herwitz | 701/301 |
| 2007/0152814 A1* | 7/2007 | Stefani | 340/539.22 |
| 2008/0169962 A1* | 7/2008 | Rees et al. | 342/29 |
| 2010/0002077 A1* | 1/2010 | Viggiano et al. | 348/115 |
| 2010/0066604 A1* | 3/2010 | Limbaugh et al. | 342/357.03 |
| 2010/0085236 A1* | 4/2010 | Franceschini et al. | 342/30 |
| 2010/0103022 A1* | 4/2010 | Stefani et al. | 342/30 |
| 2010/0283661 A1* | 11/2010 | Strain et al. | 342/30 |
| 2010/0315281 A1* | 12/2010 | Askelson et al. | 342/30 |

OTHER PUBLICATIONS

Compuship Jun./Jul. 2000: Features: "AIS at Last?", 6 pages.
Universial Shipborne Automatic Identification System (AIS) Transponder Brochure, 17 pages, downloaded from http://www.mss-marine.com/images/AIS.pdf on Jul. 13, 2011.

* cited by examiner

*Primary Examiner* — Shuwang Liu
*Assistant Examiner* — Nader Bolourchi
(74) *Attorney, Agent, or Firm* — Shumaker & Sieffert, P.A.

(57) ABSTRACT

A system and method for transmitting UAV position data to a central flight control center transmits UAV position data using a virtual transponder. A ground control station for controlling the UAV receives data from the UAV, including UAV position data. The UAV may provide GPS data, or corrected position data based on readings from an inertial navigation system. The ground control station transmits the UAV position data to a flight control center.

20 Claims, 6 Drawing Sheets

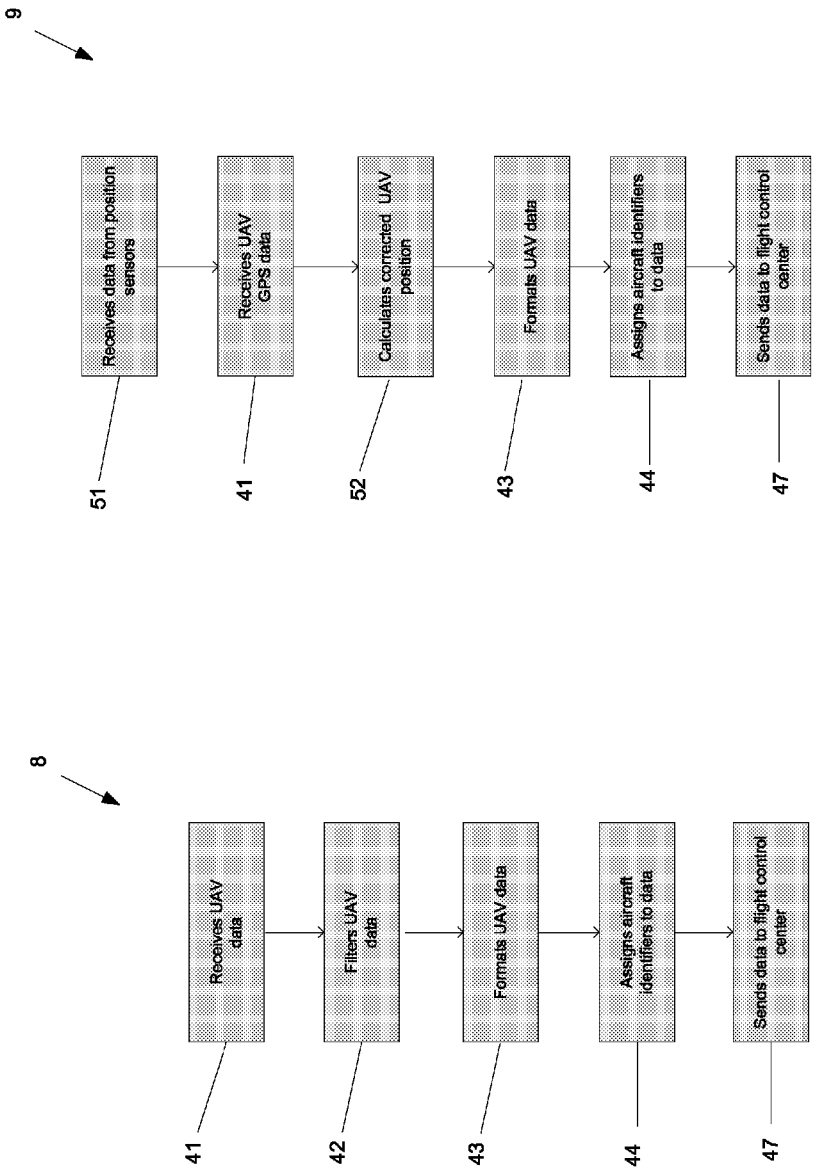

VIRTUAL OR REMOTE TRANSPONDER

FIELD OF THE INVENTION

The present invention relates generally to unmanned aerial vehicles (UAVs), a virtual transponder for a UAV, and a method of transmitting position of the UAV to a flight control center for tracking aerial vehicle positioning using the ground control station of the UAV.

BACKGROUND

Aircraft may provide positional data to flight control centers so that the flight control centers may monitor flight patterns to prevent potential collisions between aircraft. Providing aircraft location to flight control centers may be accomplished using a transponder to transmit the position data of the aircraft to the flight control center, together with data identifying the aircraft sending the information. The Federal Aviation Administration (FAA) requires aircraft to have a transponder for sending the position data of the aircraft to flight control centers.

UAVs are unmanned aerial vehicles that may be controlled by an operator on the ground via a ground control station. Alternatively, the UAV may be controlled by preprogrammed sequences and may transmit information to the ground control station. UAVs may be deployed on missions in which the UAV may fly out of the line of sight of an operator at the ground control station. UAVs may typically fly distances of 10-15 km away from the ground control station, and may have longer ranges, depending on the fuel capacity of the UAV and the transmission range of the UAV's on-board transmitter.

In order to avoid collisions between the UAV and other aerial vehicles, some prior art has employed sensors such as gimbaled video sensors in an attempt to provide visual information about the UAV's surroundings and possible collision risks. However, these sensors are limited in that they lack the ability to provide a full range of visualization in real time.

UAVs may be used in a variety of applications in which it may be desirable to transmit the position of the UAV to a flight control center for monitoring flight patterns and preventing in-air collisions. Additionally, UAVs may be required by the FAA to provide position data to flight control centers when deployed in common airspace.

UAVs may be used in military applications. Military flight control may require that the position data of the UAV be transmitted to central military flight control in order to prevent collisions between deployed military vehicles.

Search and rescue missions may employ UAVs. For example, the Coast Guard may employ a UAV to perform reconnaissance or to locate watercraft. It may be desirable for the UAV to transmit its position to a Coast Guard control center so that the Coast Guard control center may then compare the position of the UAV with target coordinates of the watercraft or of the site being monitored in order to help the UAV reach its target, or to obtain estimated coordinates for a target based on readings from sensors on the UAV and position data of the UAV. Similarly, UAVs may be used in police operations, in which the police authority may desire to receive positional data of the UAV in order to monitor its position, to aid the UAV in reaching a target, and to prevent collisions with other police, civilian, or military aerial vehicles.

Typically, aircraft transmit their position data via an onboard transponder. However, UAVs may have a total weight of fourteen pounds or less, and a typical transponder may weigh five pounds. Although it may be beneficial to transmit the position of the UAV to a central flight center, the weight of a transponder may be cumbersome, difficult to carry, or too heavy for the UAV.

Therefore, an improved method of providing UAV position data to a central flight control is needed.

SUMMARY

The present invention relates to a virtual or remote transponder for transmitting position data for a UAV to a flight control center.

The UAV may have a ground control station (GCS). The GCS may have controls for controlling the flight and operations of the UAV. The inputs from an operator may be transmitted to the UAV via a data transmission channel between the UAV and the GCS.

The GCS may transmit data to and receive data from a UAV. The GCS may receive data from the UAV comprising data obtained from sensors located on the UAV, such as video, sound, or "sniffer" sensors, as well as positional sensors, such as global positioning system (GPS) units, and inertial navigation system data. Inertial navigation system data may be data from on-board accelerometers, gyroscopic sensors, barometric pressure sensors, and temperature sensors. This data may be compiled by a controller on-board the UAV to provide corrected UAV position data, or, alternatively, may be transmitted as raw data to the GCS.

The GCS may have a virtual transponder. The virtual transponder comprises a transponder in communication with the GCS. The GCS may instruct the transponder to send information regarding the position of the UAV to a flight control center. Alternatively, the GCS may have a communications port which sends UAV position data to a flight control center continuously or at preset time intervals.

Thus, the GCS provides the capability of sending accurate UAV position data to a flight control center, without requiring a transponder to be located onboard a UAV. Because a traditional transponder may be heavy in relation to the weight of the UAV, it is advantageous to have a virtual transponder, so as to reduce the weight the UAV is required to carry.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein:

FIG. 6a is a flowchart for an alternative method of receiving UAV position data and transmitting UAV position data to a flight control center, according to an embodiment.

FIG. 6b is a flowchart for an alternative method of receiving UAV position data and transmitting UAV position data to a flight control center, according to an embodiment.

DETAILED DESCRIPTION

A system and method for transmitting UAV position data to a flight control center is described.

It may be desirable for a UAV to transmit its position data to a flight control center. Further, the FAA may require that all UAVs transmit position data to a flight control center. The flight control center may monitor flight patterns and may combine position data from aircraft in flight to prevent collisions between aircraft in flight. Thus, it may be advantageous for the UAV to transmit its position data to a flight control center to make other aircraft aware of the position of the UAV, and to prevent collisions between the UAV and other in-flight aircraft.

Typically, aircraft carry a transponder onboard to transmit position data together with aircraft identifiers to a flight control center. However, locating a traditional transponder on a UAV may be result in an unacceptable decrease in payload capacity. A UAV has limited payload weight capacity, and a transponder, which may weigh approximately 5 pounds, may take up a significant portion of that payload weight capacity. UAVs may weigh as little as 14 pounds, and design trends indicate that the UAVs will decrease further in total weight.

Figure 1:
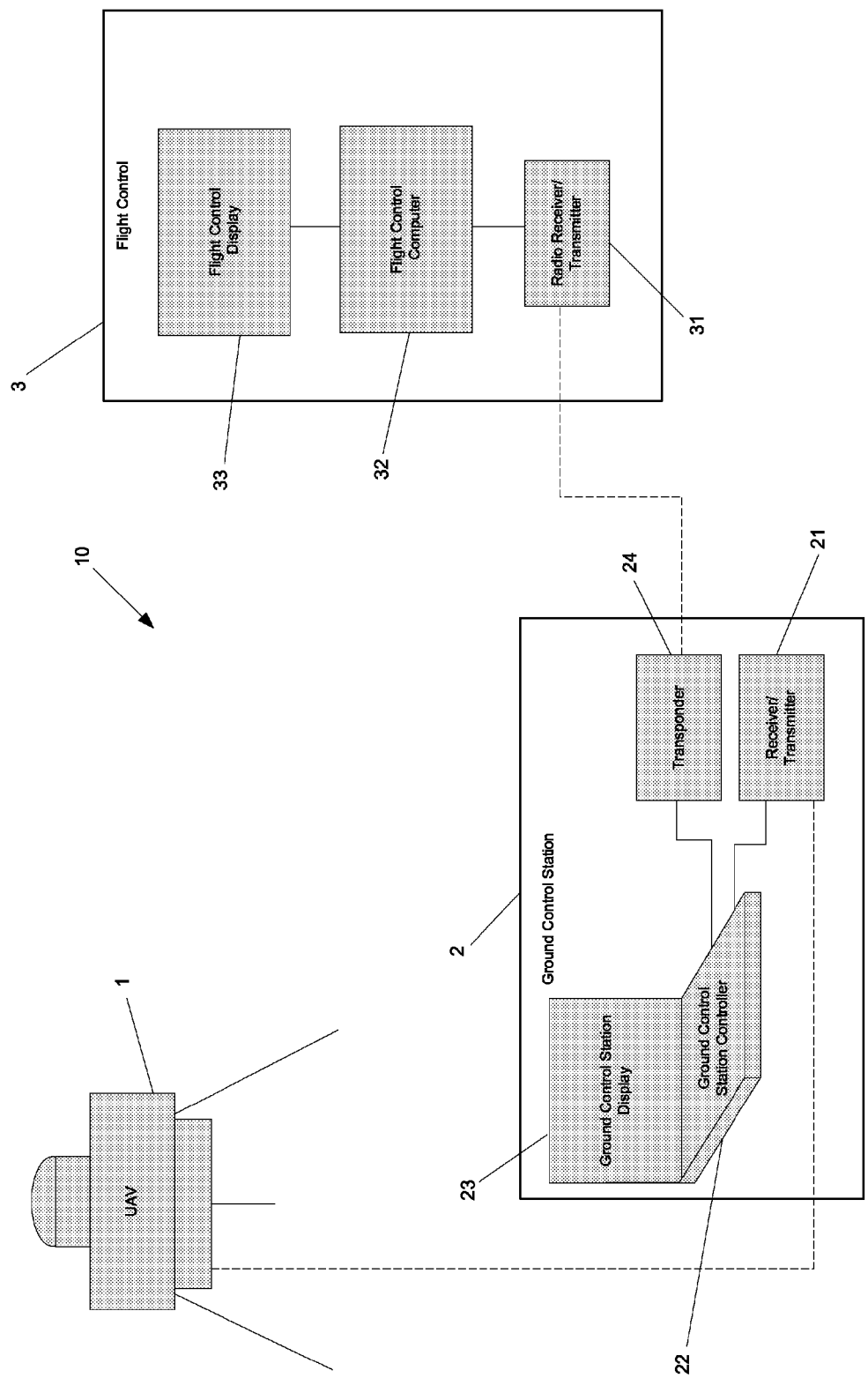
FIG. 1 is a system for a virtual transponder, according to an embodiment.

As shown in FIG. 1, a system 10 for transmitting UAV 1 position data to a flight control center 3 may have a UAV 1, a GCS 2, and a flight control center 3.

The UAV 1 may be in communication with the GCS 2. For instance, the UAV 1 may communicate with the GCS 2 via radio transmissions received and transmitted over the UAV's receiver transmitter 12, discussed further with respect to FIG. 2, and the GCS's receiver/transmitter 21. In military and other highly secure operations, it may be desirable to have a secure communications channel. The UAV 1 may communicate with the GCS 2 via a frequency-hopping broad spectrum radio transmission. These radio communication channels may be very secure and may have a broadcast range of 10-15 km. Alternatively, it may be possible for UAVs 1 to communicate with the GCS 2 via other communication methods, such as long-range wireless internet data transfer, or via a Global System for Mobile Communications or Groupe Spécial Mobile (GSM) network or a Code Division Multiple Access (CDMA) network.

The GCS 2 may be used by an operator to receive data from the UAV 1 and to transmit data to the UAV 1. The operator may control the flight and operation of the UAV 1, and may transmit commands controlling the UAV's 1 flight and operation by sending commands to the UAV 1 through the GCS 2.

The GCS 2 may be a ground control station located in an area accessible to an operator. The GCS 2 has a GCS controller 22, a GCS display 23, a transponder 24, and a receiver/transmitter 21.

The GCS controller 22 may be a processor capable of receiving information from and transmitting information through the GCS receiver/transmitter 21, and capable of instructing the GCS transponder 24 to send information to a flight control transponder 31. The GCS controller 22 may also be capable of filtering data received from the UAV 1 and instructing the transponder 24 to send the filtered data to the flight control center 3.

The GCS receiver/transmitter 21 may be a stand-alone radio receiver/transmitter, or it may be a device incorporated into the GCS controller 22. The GCS receiver/transmitter 21 may be a device capable of receiving transmissions from the UAV receiver/transmitter 21, discussed further with respect to FIG. 2.

The GCS 2 has a GCS transponder 24. The GCS transponder 24 may be capable of transmitting data, the data comprising position data for the UAV and an identifier identifying the UAV 1, in response to a signal from a flight control center 3. The GCS transponder 24 may be a stand-alone transponder of the type typically installed on aircraft. Alternatively, the GCS transponder 24 may be a virtual transponder, combined with the GCS receiver/transmitter 21 or the GCS controller 22. The GCS transponder 24 may send data prepared by the GCS controller 22 to a flight control radio receiver/transmitter 31 in response to the receipt of a signal from the flight control center 3 requesting UAV 1 position data.

The GCS transponder 24 may be capable of receiving information from the flight control center 3 comprising position data for other aircraft in the vicinity of the UAV 1. The GCS controller 22 may receive this data via the GCS transponder 24.

The GCS 2 may have a GCS display 23. The GCS display 23 may display information useful to the operator in controlling the flight and actions of the UAV 1 and receiving data from the UAV 1. The GCS display 23 may display one or more maps contained in the memory of the GCS controller 22, and may display UAV 1 position on the maps. Further, the GCS controller 22 may receive information comprising the position of other aircraft in the vicinity of the UAV 1 from flight control center 3, and may display this information, together with the UAV 1 position, on the maps.

The flight control center 3 has a flight control computer 32, a flight control display 33, and a flight control radio receiver/transmitter 31. The flight control center may be a central information processing center for processing information regarding the position of aircraft in a given airspace. The flight control center 3 may process this data to create maps indicating aircraft position and trajectory, and may use this data to inform aircraft of possible collision risks. The flight control center 3 may be an FAA flight control center, or, alternatively, it may be a flight control center 3 controlled by a different entity, such as a military, police, or civilian group.

The flight control center 3 has a flight control center computer 32 for processing this information. The flight control center computer 32 may also create maps indicating the position and trajectory of aircraft in an airspace. The flight control center computer 32 may display these maps on the flight control display 33. The flight control computer 32 may also make information regarding the position and trajectory of aircraft in an airspace available by transmitting this information via its flight control center radio receiver/transmitter 31.

Figure 2:
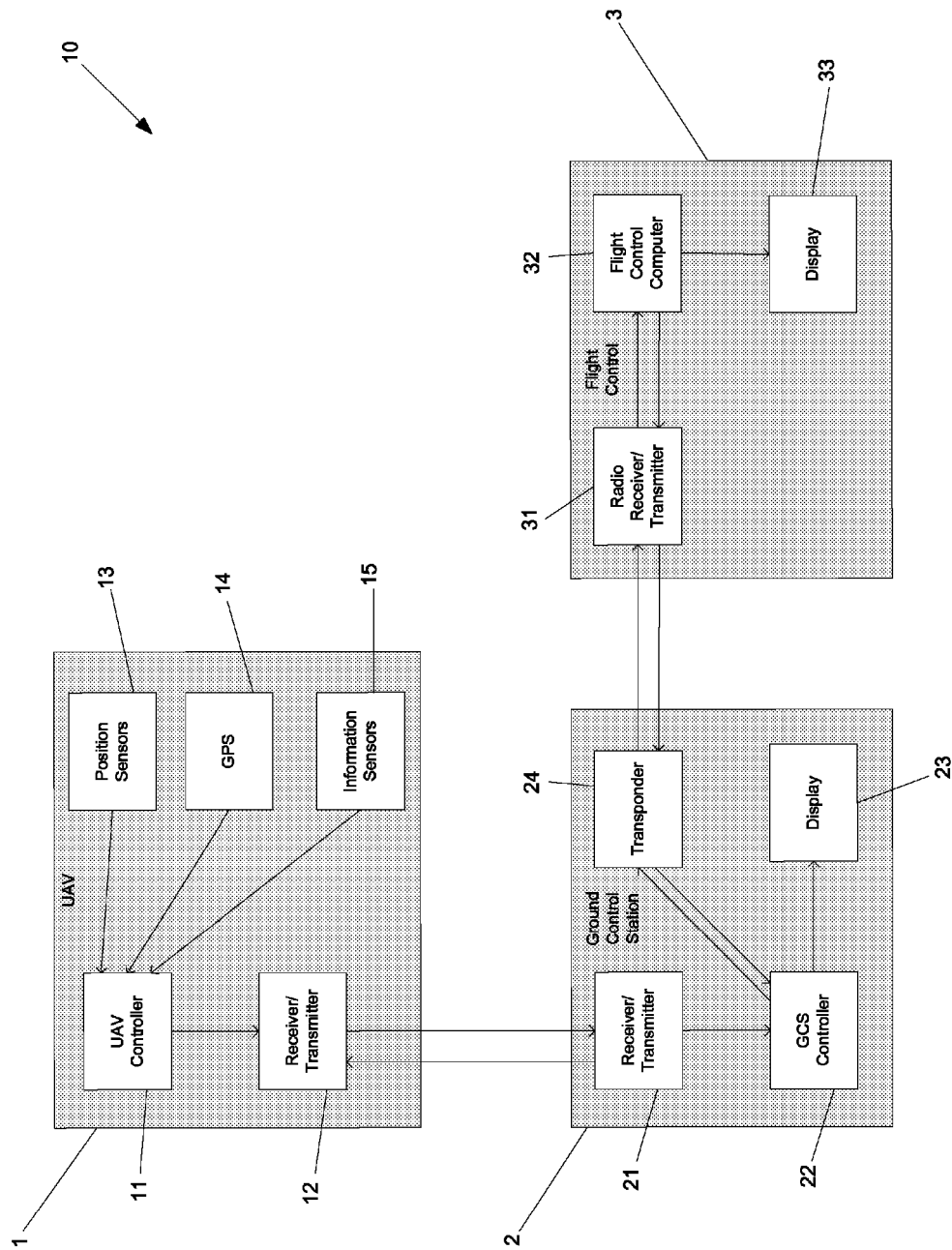
FIG. 2 is a system view of a system for a virtual transponder, according to an embodiment.

Referring to FIG. 2, the UAV 1 may have a UAV controller 11, a UAV receiver/transmitter 12, position sensors 13, GPS unit 14, and information sensors 15.

The UAV controller 11 may be located onboard the UAV 1. The UAV controller 11 may receive inputs from the position sensors 13, the GPS unit 14, the information sensors 15, and the receiver/transmitter 12.

The GPS unit 14 may be an electronic device capable of determining the position of the UAV 1 by measuring signals from a plurality of satellites. The GPS unit 14 may be a stand-alone GPS device, or, alternatively, it may be incorporated into the UAV controller 11. The GPS unit 14 provides the UAV controller 11 with data comprising position data for the UAV 1 calculated using the GPS system.

The UAV 1 may have position sensors 13 such as gyroscopic sensors, barometric sensors, temperature sensors, and accelerometers. The UAV 1 may have an inertial navigation system, which may include the above-listed gyroscopic sensors, barometric sensors, temperature sensors, and accelerometers. The inertial navigation system may use inputs from these sensors to determine changes in the orientation of the UAV 1, the altitude of the UAV 1, and the acceleration of the UAV 1 in one or more directions. The inertial navigation system may use the data collected by these sensors to maintain the stability of the UAV 1 and to improve control of the UAV 1, and to obtain values for positional changes of the UAV 1.

The UAV 1 may carry information sensors 15, such as video sensors, sound sensors, "sniffer" sensors for detecting levels of contaminants or other substances, infrared sensors, and a variety of other types of sensors for collecting data in the surroundings of the UAV 1.

The receiver/transmitter 12 may be a receiver/transmitter capable of receiving and transmitting information to and from the GCS receiver/transmitter 1. The receiver/transmitter 12 may be a radio receiver/transmitter, or, alternatively, it may be another type of data transfer device, such as a device capable of communicating via long-range wireless internet data transfer, or via GSM or CDMA cellular networks, for example.

The UAV controller 11 may process information received from the positional sensors 13, the GPS unit 14, the information sensors 15, and the receiver/transmitter 12. The UAV controller 11 may receive this information and may select information to transmit to the GCS 2 based on a pre-programmed sequence. Alternatively, the UAV controller 11 may instruct the receiver/transmitter 12 to send all received information to the GCS 2.

The data from the inertial navigation system may be used to create "corrected" position data when combined with readings from the GPS unit 14. The UAV controller 11 may compare the data from the GPS unit 14 and the data from the inertial navigation system, and may run a program to determine corrected position data in order to obtain possibly more accurate data for the UAV 1 position than that which may be provided by the GPS unit 14 alone. Alternatively, the data from the inertial navigation system and the GPS unit 14 may be transmitted from the UAV 1 to the GCS 2, and the GCS controller 22 may run a program to determine corrected position data. Alternatively, all data may be transmitted to a flight control center, and the controller at the flight control center may run a program to determine corrected position data for the UAV 1.

The GCS 2 may receive data transmitted by the UAV 1. The GCS controller 22 may filter the data to select data to be sent to the flight control center 3. The GCS controller 22 may select position data for the UAV 1, and may add data identifying the UAV 1 for which the position data is being transmitted. The GCS controller 22 may format the data to be received by the flight control center 3. For example, the flight control center 3 may receive binary data transmitted over a given radio frequency and having given identifier codes. The GCS controller 22 may have information required to format the data to be compatible with the flight control center's 3 information receiving system. The GCS controller 22 may provide the GPS unit's 14 position data, or, alternatively, may provide the corrected position data calculated by the inertial navigation system.

Figure 3:
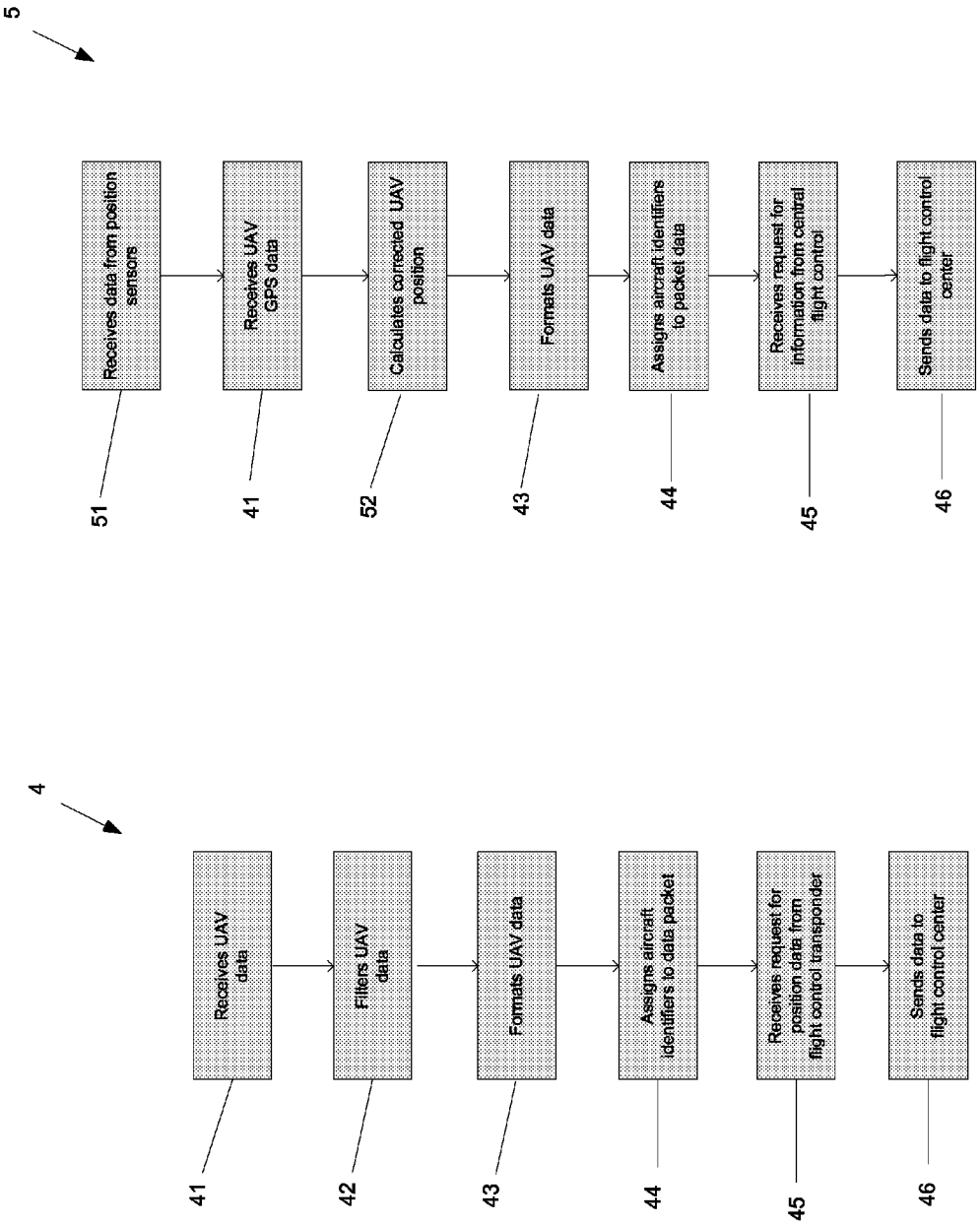
FIG. 3a is a flowchart for a method of receiving UAV position data and transmitting UAV position data to a flight control center, according to an embodiment.
FIG. 3b is a flowchart for an alternative method of receiving UAV position data and transmitting UAV position data to a flight control center, according to an embodiment.

FIG. 3a shows a method 4 for receiving UAV data and transmitting UAV position data to a flight control center. The method 4 comprises receiving UAV data 41, filtering UAV data 42, formatting UAV data 43, assigning aircraft identifiers to data 44, receiving a request for position data from the flight control transponder 45, and sending data to the flight control center 46.

In step 41, the GCS 2 receives UAV 1 data as described with respect to FIGS. 1 and 2. The UAV 1 may transmit data comprising UAV position data from the GPS unit 14. The UAV 1 may transmit data comprising corrected position data, calculated as described with respect to FIG. 2. The UAV 1 may also transmit other data, such as sensor data.

In step 42, the GCS 2 may filter the data received from the UAV 1 to select the data to be sent to the flight control center 3. The filtering step 42 may be accomplished by a program located in the memory of the GCS controller 22. The program may have preset parameters for selecting data to send to the flight control center 3, and the parameters may be based on the requirements of the flight control center 3.

In step 43, the GCS controller 22 formats the filtered UAV 1 position data. The GCS controller 22 may format the UAV 1 position data to comply with data format types which may be received by the flight control center 3. For example, some FAA flight control centers 3 may require that data comprising UAV 1 position data be transmitted in binary pulses.

In step 44, the GCS controller 22 assigns aircraft identifiers to identify the UAV 1 for which the position data is being transmitted.

In step 45, the GCS controller 22 receives a request from a flight control center 3 to send UAV 1 position data. The request from the flight control center 3 may be sent to the GCS controller 22 by the GCS transponder 24.

In step 46, in response to the receipt of a request from the flight control center 3, the GCS controller 22 sends data comprising the UAV 1 position to the flight control center 3. The GCS controller may send the data via the GCS transponder 24.

FIG. 3b shows an alternative method 5 for receiving UAV data and transmitting UAV position data to a flight control center. The method 5 comprises receiving UAV data 41, receiving data from UAV position sensors 51, calculating corrected UAV position data 52, formatting UAV data 43, assigning aircraft identifiers to data 44, receiving a request for position data from the flight control transponder 45, and sending data to the flight control center 46. Steps 41, 43, 44, 45, and 46 may be performed as described with respect to FIG. 3a.

In step 51, the GCS controller 22 may receive data from the UAV position sensors 13. The data from the position sensors 13 may comprise data obtained from accelerometers, gyroscopic sensors, barometric sensors, and temperature sensors. The data from the position sensors 13 may be transmitted to the GCS 2 with other UAV 1 data, as described with respect to FIGS. 1 and 2.

In step 52, the GCS controller calculates corrected UAV 1 position data by compiling data from the position sensors 13 and the GPS unit 14. The corrected UAV 1 position data may be determined as described with respect to FIGS. 1 and 2, and may be accomplished by a program located in the memory of the GCS controller 22.

As described with respect to FIG. 3a, in step 43, the GCS controller 22 formats UAV data; in step 44, the GCS controller 22 assigns aircraft identifiers to the data; in step 45, the GCS controller 22 receives a request for position data from the flight control center 3; and, in step 46, the GCS controller 22 sends data comprising corrected UAV 1 position data to the flight control center 3.

UAVs 1 may be used in military applications, to perform reconnaissance, to obtain video surveillance of an area, to assist in mapping terrain, to perform environmental tests, to install or remove sensors or transmitters, and a variety of other applications. Military flight control may require that the position data of the UAV 1 be transmitted to central military flight control in order to prevent collisions between deployed military vehicles. It may also be desirable to transmit UAV 1 position data to central military flight control, as the flight control center may obtain better correlation between position and the data obtained by the UAV. For instance, if the UAV 1 is collecting video information, the video and the position of the UAV 1 may be tracked together to detect the location of the items surveiled.

Search and rescue missions may employ UAVs 1 as well. For instance, the Coast Guard may employ a UAV 1 to perform reconnaissance or to locate watercraft. It may be desirable for the UAV 1 to transmit its position to a central Coast Guard control center so that the Coast Guard may correlate UAV 1 data with accurate position data. The Coast Guard control center may then compare the position of the UAV with target coordinates of the watercraft or of the site being monitored in order to help the UAV reach its target, or, alternatively, may use the UAV position data to obtain approximate coordinates for a watercraft based on information obtained by the UAV 1.

Similarly, UAVs 1 may be used in police operations, in which the police authority may desire to receive positional data of the UAV in order to monitor both its position, to aid the UAV 1 in reaching a target, and to prevent collisions with other police aerial vehicles.

Figure 4:
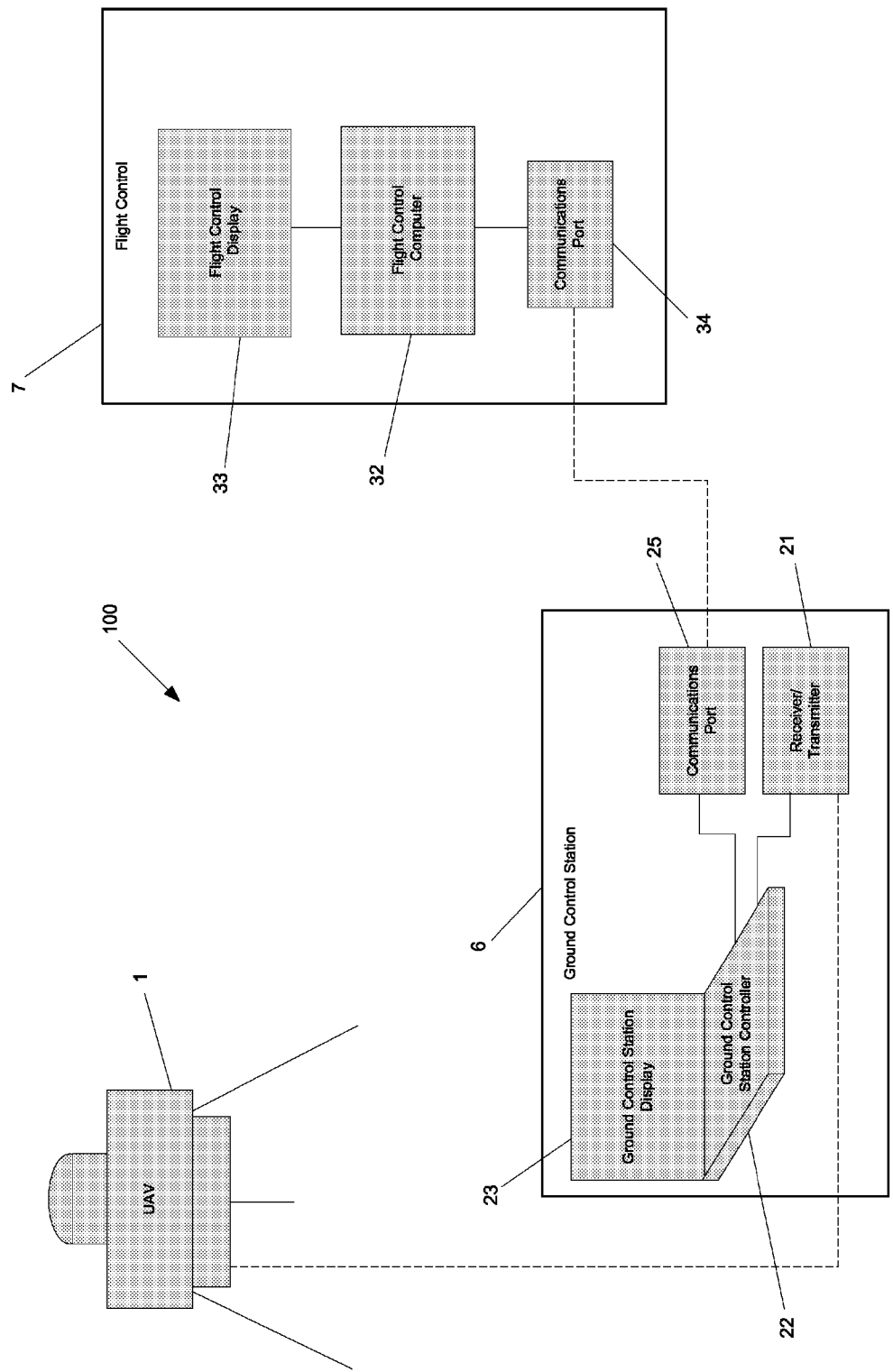
FIG. 4 is a system for transmitting UAV position data to a flight control center, according to an embodiment.

As shown in FIG. 4, a system 100 for transmitting UAV 1 position data to a flight control center 7 may have a UAV 1, a GCS 6, and a flight control center 7.

The UAV 1 may be in communication with the GCS 6 as described with respect to FIGS. 1 and 2.

The GCS 2 may have a GCS controller 22, a GCS display 23, and a receiver/transmitter 21, as described with respect to FIG. 1. The GCS 2 may also have a communications port 25.

The flight control center 7 may have a flight control computer 32, a flight control display 33, as described with respect to FIG. 1, and a flight control communications port 34.

The communications ports 25, 34 may allow the GCS 6 to communicate with the flight control center 7 via a long-range wireless internet connection, via a GSM or CDMA network, or via a hard-wired internet connection, if available.

The GCS controller 22 may be capable of sending UAV 1 position data to the flight control center 7 via the communications ports 25, 34. The communications ports 25, 34 may be stand-alone communications ports, such as an internet hub or a cellular network card. Alternatively, the GCS communications port 25 may be incorporated into the GCS controller 22. The GCS controller 22 may send UAV 1 position data via the communications port 25 to the flight control center 7. The GCS controller 22 may send UAV 1 position data continuously, or it may send UAV 1 position data at predetermined intervals of time.

The GCS controller 22 may receive data from the flight control center 7 via communications ports 25, 34. The data received by the GCS controller 22 may comprise position data for other airborne vehicles, topographical information, or updated map data.

Figure 5:
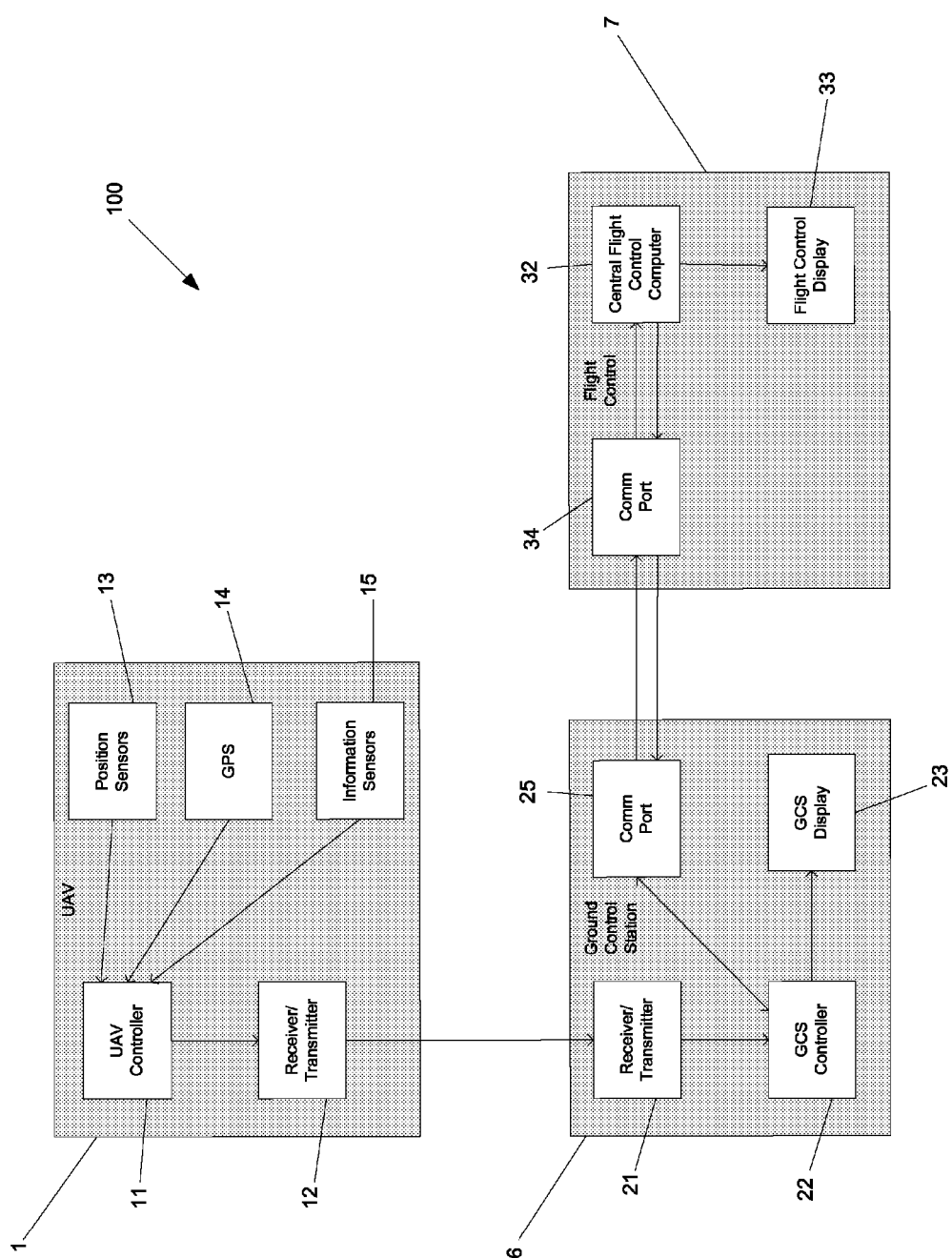
FIG. 5 is a system view of a system for transmitting UAV position data to a flight control center, according to an embodiment.

Referring to FIG. 5, the system 100 functions as described with respect to FIG. 1, except that the GCS 6 and the flight control center 7 communicate via communications ports 25, 34. The communications port 24 may be integrated into the GCS controller 22, and the communications port 35 may be integrated into the flight control computer 32.

FIG. 6a shows a method 8 for receiving UAV data and transmitting UAV position data to a flight control center. The method 8 comprises receiving UAV data 41, filtering UAV data 42, formatting UAV data 43, assigning aircraft identifiers to data 44, and sending data to the flight control center 47.

In step 41, the GCS controller 22 may receive UAV 1 data via receiver/transmitters 12, 21. In step 42, the GCS controller 22 may filter the UAV 1 data to select data to send to the flight control center 7, as described with respect to FIGS. 3a, 3b. In step 43, the GCS controller 22 formats the UAV 1 data into a format which may be received and processed by the flight control center 7. In step 44, the GCS controller 22 assigns aircraft identifiers to identify the UAV 1 for which the position data is being transmitted.

In step 47, the GCS controller 22 sends data comprising the UAV 1 position to the flight control center 7 via the communications ports 25, 34. The GCS controller may send the data continuously, or at preset intervals of time.

FIG. 6b shows a method 9 for receiving UAV data and transmitting UAV position data to a flight control center. The method 9 comprises receiving data from UAV position sensors 51, receiving UAV data 41, calculating corrected UAV 1 position 52, formatting UAV data 43, assigning aircraft identifiers to data 44, and sending data to the flight control center 47. Steps 41, 43, 44, and 47 may be accomplished as described with respect to FIG. 3a. Steps 51 and 52 may be accomplished as described with respect to FIG. 3b. Method 9 provides corrected UAV 1 position data via communications ports 25, 34 continuously, or, alternatively, at predetermined intervals of time.

Because UAVs 1 may be utilized in military, police, search and rescue, and civilian operations, it may be beneficial to provide a simple interface to a central flight control that may be capable of receiving information via communications port 34. Additionally, FAA flight control centers may become capable of receiving data transmitted via other broadcast formats than the current standard radio transponder method. Therefore, a method of transmitting UAV 1 position data via communications ports 25, 34 may be beneficial.

It should be understood that the illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

We claim:

1. A method of transmitting position data for an unmanned aerial vehicle (UAV) to a flight control center, the method comprising:

transmitting, by a UAV controller onboard the UAV, UAV position data from a Global Positioning System (GPS) unit located onboard the UAV to a ground control station, wherein the UAV controller transmits the UAV position data to the ground control station via a transmitter onboard the UAV and a receiver at the &round control station, and wherein the ground control station is separate from the UAV and the ground control station controls the operation of the UAV;

formatting the UAV position data by a ground control station controller included in the ground control station, wherein the UAV position data is formatted to be received by the flight control center;

assigning aircraft identification to the formatted UAV position data; and transmitting the formatted UAV position data from the ground control station to the flight control center, wherein the flight control center receives position data for a plurality of aerial vehicles.

2. The method of claim 1, further comprising:
receiving a signal from the flight control center requesting UAV position data; and
in response to receiving the signal, transmitting the UAV position data to the flight control center.

3. The method of claim 1, further comprising:
receiving with the UAV controller at least one input from an inertial navigation system, wherein the inertial navigation system comprises:
at least one accelerometer sensor;
at least one gyroscopic sensor;
at least one temperature sensor; and
at least one barometric pressure sensor;
calculating with the UAV controller a corrected UAV position data; and
transmitting the corrected UAV position data to the ground control station.

4. The method of claim 1, further comprising:
receiving, with the UAV controller, at least one input from an inertial navigation system, wherein the inertial navigation system comprises:
at least one accelerometer sensor;
at least one gyroscopic sensor;
at least one temperature sensor; and
at least one barometric pressure sensor;
transmitting the at least one input from the inertial navigation system to the ground control station;
calculating, with the ground control station controller, a corrected UAV position data; and
transmitting the corrected UAV position data to the flight control center.

5. The method of claim 1, further comprising:
displaying on a ground control station display at least one map, wherein the ground control station controller has the at least one map stored in its memory;
displaying on the ground control station display the position of the UAV.

6. The method of claim 5, further comprising:
receiving from the flight control center data comprising positions of at least one airborne vehicle in an airspace of the UAV;
displaying the position of the at least one airborne vehicle on the at least one map.

7. The method of claim 1,
wherein the ground control station further comprises a communications port, and
wherein the ground control station controller transmits data to and receives data from the flight control station via the communications port.

8. The method of claim 1, further comprising:
transmitting the UAV position data to the flight control center continuously.

9. The method of claim 1, further comprising:
transmitting data from the UAV to the ground control station via a broad spectrum, frequency hopping radio signal between the UAV transmitter and the ground control station receiver.

10. A system for transmitting position data for an unmanned aerial vehicle (UAV) to a flight control center, the system comprising:
the UAV, comprising:
a UA V controller;
a VA V receiver and transmitter;
a Global Positioning System (GPS) unit, wherein the GPS unit is configured to provide a GPS position of the UAV; and
a ground control station, comprising:
a ground control station controller; and
a ground control station receiver and transmitter;
wherein the UAV controller is configured to transmit UAV position data based on the GPS position of the UAV to the ground control station via the UAV transmitter and the ground control station receiver,
wherein the ground control station controller is configured to transmit the UAV position data to the flight control center, and
wherein the flight control center is configured to receive position data for a plurality of aerial vehicles, and
wherein the UAV controller is a controller onboard the UAV configured to provide the UAV position data to the ground control station.

11. The system of claim 10,
wherein the ground control station further comprises a transponder,
wherein the transponder is configured to receive a request from the flight control center to provide UAV position data, and
wherein, in response to the request from the flight control center to provide UAV position data, the ground control station controller is configured to instruct the transponder to send UAV position data to the flight control center.

12. The system of claim 11, further comprising
an inertial navigation system comprising:
at least one accelerometer sensor;
at least one gyroscopic sensor;
at least one temperature sensor; and
at least one barometric pressure sensor,
wherein the UAV controller is configured to receive at least one input from the inertial navigation system sensors.

13. The system of claim 12,
wherein the UAV controller is configured to calculate a corrected UAV position based on the at least one input from the inertial navigation system, and
wherein the UAV controller is configured to transmit the corrected UAV position to the ground control station.

14. The system of claim 12,
wherein the UAV controller is configured to transmit the at least one input from the inertial navigation system sensors to the ground control station,
wherein the ground control station is configured to calculate a corrected UAV position based on the at least one input from the inertial navigation system sensors, and
wherein the ground control station is configured to transmit the corrected UAV position to the flight control center.

15. The system of claim 10,
wherein the ground control station further comprises a display,
wherein the ground control station controller has at least one map stored in its memory, and
wherein the ground control station controller is configured to display the at least one map and the UAV position on the ground control station display.

16. The system of claim 15,
wherein the ground control station controller is configured to receive information from the flight control center comprising position data for at least one airborne vehicle in airspace of the UAV, and
wherein the ground control station controller is configured to display the UAV position and a position of the at least one airborne vehicle in the airspace of the UAV on the display based on the position data for the at least one airborne vehicle.

17. The system of claim 10, wherein the ground control station further comprises a communications port, and wherein the ground control station controller is configured to transmit data to and receive data from the flight control station via the communications port.

18. The system of claim 10, wherein the ground control station controller is configured to transmit the UAV position data to the flight control center continuously.

19. The system of claim 10, wherein the UAV controller is configured to transmit data to the ground control station via a broad-spectrum, frequency hopping radio signal between the UAV transmitter and the ground control station receiver.

20. A system for transmitting unmanned aerial vehicle (UAV) position data to a flight control center, the system comprising:

a UAV controller located on onboard a UAV; and a ground station controller located at a ground control station;

wherein the UAV controller is configured to transmit the UAV position data to the ground station controller;

wherein the ground control station controller is configured to store at least one map; and wherein the ground control station is configured to, in response to receiving a request from the flight control center to provide UAV position data, send the UAV position data to the fight control center.

* * * * *

UNITED STATES PATENT AND TRADEMARK OFFICE
CERTIFICATE OF CORRECTION

PATENT NO. : 8,358,677 B2
APPLICATION NO. : 12/145349
DATED : January 22, 2013
INVENTOR(S) : Daniel Ross Collette et al.

It is certified that error appears in the above-identified patent and that said Letters Patent is hereby corrected as shown below:

In the Claims:

Claim 1, col. 8, line 54: "&round" should be changed to --ground--;

Claim 3, col. 9, line 7: "receiving with the UAV controller at" should be changed to --receiving, with the UAV controller, at--;

Claim 3, col. 9, line 14: "calculating with the UAV controller a corrected UAV position data" should be changed to --calculating, with the UAV controller, a corrected UAV position data--;

Claim 10, col. 9, line 63: "a VAV" should be changed to --a UAV--;

Claim 16, col. 10, line 62: "in airspace" should be changed to --in an airspace--;

Claim 20, col. 12, line 4: "located on onboard a UAV" should be changed to --located onboard a UAV--.

Signed and Sealed this
Thirtieth Day of July, 2013

Teresa Stanek Rea
*Acting Director of the United States Patent and Trademark Office*